3,767,800
SUBSTITUTED RIBOFURANOSIDES AS HYPOLIPIDEMICS

Mario G. Buzzolini, Morristown, N.J., assignor to Sandoz-Wander, Inc., Hanover, N.J.
No Drawing. Filed Feb. 7, 1972, Ser. No. 224,325
Int. Cl. A61k 27/00
U.S. Cl. 424—180      11 Claims

ABSTRACT OF THE DISCLOSURE

Certain ribofuranosides, e.g., methyl 5-(6-amino-3H-purin-9-yl)-5-deoxy-2,3-O-isopropylidene ribofuranoside, are useful as hypolipidemic agents.

---

This invention relates to the pharmaceutical activity of ribofuranoside derivatives. More particularly, this invention concerns the use of purine substituted ribofuranosides in the treatment of lipidemia in mammals. The invention also relates to pharmaceutical compositions containing the above compounds as an active ingredient thereof.

The active agents with which this invention is concerned may be represented by the following structural formula:

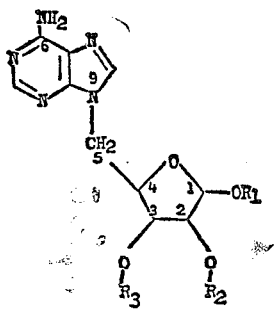

where $R_1$ is hydrogen or lower alkyl, i.e., alkyl having 1 to 3 carbon atoms, e.g., methyl, ethyl, isopropyl and the like, and $R_2$ and $R_3$ each represent hydrogen or together represent

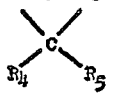

where $R_4$ and $R_5$ each independently represent lower alkyl as defined above or one of $R_4$ or $R_5$ is hydrogen and the other is phenyl.

The preferred compound of Formula I is the compound in which $R_1$ is methyl and $R_2$ and $R_3$ together are isopropylidene, namely methyl 5-(6-amino-9H-purin-9-yl)-5-deoxy-2,3,O-isopropylidene ribofuranoside.

The compounds of Formula I above are known and may be prepared according to methods disclosed in the literature from known materials. The present invention contemplates only the novel use of such compounds in pharmaceutical applications, particularly as hypolipidemic agents.

As previously indicated, the compounds of Formula I are useful because they possess pharmacological activity in animals, particularly as hypolipidemic agents as indicated by the fall in cholesterol and triglyceride levels in male albino Wistar rats weighing 110–130 g. initially. The rats are maintained on drug-free laboratory chow diet for seven days and then divided into groups of 8 to 10 animals. Each group with the exception of the control is then given orally 30 milligrams per kilogram of body weight per diem of the compound for six days. At the end of this period, the animals are anesthetized with sodium hexobarbital and bled from the carotid arteries. Serum or plasma samples are collected, and 1.0 ml. samples of the serum are added to 9.0 ml. redistilled isopropanol. Two autoanalyzer cupsful of a mixture of zeolite-copper hydroxide and Lloydds reagent (Kessler, G., and Lederer, H., 1965, Technicon Symposium, Mediad Inc., New York, 345–347) are added, and the mixture is shaken for one hour. Cholesterol and triglyceride levels are determined simultaneously on the same sample by Technicon N–24A (cholesterol) and N–78 triglyceride) methodology. The means total serum cholesterol levels are then computed and hypocholesterolemic activity is expressed as the fall in cholesterol levels as a percentage of the control level. The change in serum triglyceride levels induced by the drug is computed as a percentage of the control triglyceride levels.

For such usage, the compounds may be administered orally or parenterally as such or admixed with conventional pharmaceutical carriers. They may be administered in such forms as tablets, dispersible powders, granules, capsules, syrups and elixirs and parenterally as solutions, suspensions, dispersions, emulsions and the like, e.g. a sterile injectable aqueous solution. The compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, oral liquids, e.g. suspensions may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-o-hydroxybenzoate). Capsules may contain the active ingredient alone or admixed with an inert solid diluent, e.g., calcium carbonate, calcium phosphate and kaolin. The injectable compositions are formulated as known in the art. These pharmaceutical preparations may contain up to about 90% of the active ingredient in combination with the carrier or adjuvant.

The hypolipidemic effective dosage of active ingredient employed in the alleviation of lipidemia may vary depending on the particular compound employed and the severity of the condition being treated. However, in general, satisfactory results are obtained when the compounds of Formula I are administered at a daily dosage of from about 0.7 milligram to about 250 milligrams per kilogram of animal body weight, preferably given in divided doses two to four times a day, or in sustained release form. For most large mammals, the total daily dosage is from about 60 milligrams to about 2000 milligrams. Dosage forms suitable for internal use comprise from about 15 to about 1000 milligrams of the active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets containing from about 50 to 250 milligrams of the active ingredient.

EXAMPLE 1

Tablets and capsules suitable for oral administration which contain the following ingredients may be prepared by conventional techniques. Such tablets and capsules are useful in treating lipidemia at a dose of one tablet 2 to 4 times a day.

| Ingredients | Weight (mg.) | |
|---|---|---|
| | Tablet | Capsule |
| Methyl 5-(6-amino-9H-purin-9-yl)-5-deoxy-2,3-O-isopropylidene ribofuranoside | 50 | 100 |
| Tragacanth | 10 | |
| Lactose | 197.5 | 200 |
| Corn starch | 25 | |
| Talcum | 15 | |
| Magnesium stearate | 2.5 | |

EXAMPLE 2

Following the same procedure as in Example 1, tablets and capsules suitable for oral administration which contain methyl 5 - (6-amino-9H-purin-9-yl)-5-deoxy-2,3-O-benzylidene ribofuranoside in place of the methyl 5-(6-amino-9H - purin - 9 - yl)-5-deoxy-2,3-O-isopropylidene ribofuranoside are prepared. Such capsules are useful in treating lipidemia at a dose of one capsule 2 to 4 times a day.

EXAMPLE 3

The following formulations for syrups or elixirs containing an effective amount of active compound may be formulated using conventional methods. The syrups or elixirs may be administered at a dosage of one or two tablespoons once or twice a day.

| Ingredients | Percent by weight | |
|---|---|---|
| | Syrup | Elixir |
| Methyl 5-(6-amino-9H-purin-9-yl)-5-deoxy-2,3-O-isopropylidene ribofuranoside | 0.5-3.5 | 0.5-3.5 |
| Buffering system | (a) | (a) |
| Sodium benzoate | 0.1-0.5 | 0.1-0.5 |
| Flavoring agent | 0.01-0.2 | 0.01-0.2 |
| Water | 20-40 | 5-20 |
| Simple syrups U.S.P | 30-70 | 0 |
| Sorbitol solution (70%) | 10-30 | 20-60 |
| Certified dye | 0.5-2 | 0.5-2 |
| Alcohol | 0 | 2.5-20 |
| Methyl paraben | 0 | 0.05-0.1 |
| Propyl paraben | 0 | 0.05-0.1 |
| Sodium saccharin | 0 | 0.01-0.08 | a Quantity sufficient to adjust pH.

Similar syrups and elixirs may be prepared in the same manner using methyl 5 - (6-amino-9H-purin-9-yl)-5-deoxy-2,3-O-benzylidene ribofuranoside in place of the methyl 5 - (6 - amino-9H-purin-9-yl)-5-deoxy-2,3-O-isopropylidene ribofuranoside.

EXAMPLE 4

The following ingredients are dissolved in water for injection. The resulting solution is filtered through an appropriate medium to form a clear solution, and is then autoclaved to render it sterile. The solution may be administered at a dosage of one or two milliliters once or twice a day.

Ingredient: Weight (percent)
Methyl 5 - (6-amino-9H-purin-9-yl)-5-deoxy - 2,3 - O-isopropylidene ribofuranoside _____ 10.
Sodium alginate _____ 0.5.
Buffering agent _____ As desired.
Lecithin _____ 0.5.
Sodium chloride _____ As desired.
Water, q.s. to 1 ml.

Similarly an injectable solution may be prepared in the same manner using methyl 5-(6-amino-9H-purin-9-yl)-5-deoxy-2,3-O-benzylidene ribofuranoside in place of the methyl 5-(6-amino-9H-purin-9-yl) - 5 - deoxy-2,3-O-isopropylidene ribofuranoside.

EXAMPLES 5 AND 6

Tablets and capsules containing the ingredients indicated below may be prepared by conventional techniques and are useful in treating lipidemia at a dose of one tablet or capsule 2 to 4 times a day.

| Ingredients | Weight (mg.) | |
|---|---|---|
| | Tablet | Capsule |
| 5-(6-amino-9H-purin-9-yl)-5-deoxyribofuranoside | 50 | 50 |
| Tragacanth | 10 | |
| Lactose | 197.5 | 250 |
| Corn starch | 25 | |
| Talcum | 15 | |
| Magnesium stearate | 2.5 | |
| Total, mg | 300 | 300 |

EXAMPLE 7

The following formulations for syrups or elixirs containing an effective amount of active compound may be formulated using conventional methods. The syrup or elixir may be administered at a dosage of one or two tablespoons once or twice a day.

| Ingredients | Percent by weight | |
|---|---|---|
| | Syrup | Elixir |
| 5-(6-amino-9H-pyrin-9-yl)-5-deoxyribofuranoside | 0.5-3.5 | 0.5-3.5 |
| Buffering system | (a) | (a) |
| Sodium benzoate | 0.1-0.5 | 0.1-0.5 |
| Flavoring agent | 0.01-0.2 | 0.01-0.2 |
| Water | 20-40 | 5-20 |
| Simple syrups U.S.P | 30-70 | 0 |
| Sorbitol solution (70%) | 10-30 | 20-60 |
| Certified dye | 0.5-2 | 0.5-2 |
| Alcohol | 0 | 2.5-20 |
| Methyl paraben | 0 | 0.05-0.1 |
| Propyl paraben | 0 | 0.05-0.1 |
| Sodium saccharin | 0 | 0.01-0.08 | a Quantity sufficient to adjust pH.

EXAMPLE 8

The following ingredients are dissolved in water for injection. The resulting solution is filtered through an appropriate medium to form a clear solution and is then autoclaved to render it sterile. The solution may be administered at a dosage of one or two milliliters once or twice a day.

Ingredient: (Weight percent)
5-(6 - amino - 9H - purin - 9 - yl)-5-deoxy ribofuranoside _____ 10.
Sodium alginate _____ 0.5.
Buffering agent _____ As desired.
Lecithin _____ 0.5.
Sodium chloride _____ As desired.
Water, q.s. to 1 ml.

This methyl 5-(6-amino - 9H - purin - 9 - yl)-5-deoxy-2,3-O-isopropylidene ribofuranoside used in the above formulations is prepared by the following procedure:

The sodium salt of adenine is prepared by stirring a suspension of 8.2 g. of adenine and 2.82 g. of sodium hydride (in mineral oil) in 100 ml. dimethylformamide at 80–85° for 1½ hours. To this suspension is added dropwise at 80–85° a solution of 21 g. of methyl 2,3-O-isopropylidene - 5 - O - tosyl - β - D - ribofuranoside in 100 ml. dimethylformamide, and stirring is continued at the same temperature for 30 hours. After cooling, the solution is evaporated to dryness in vacuo; and the resulting residue is treated with 50 ml. of water and extracted three times with a mixture of chloroform methanol (9:1). The organic layers are combined, dried over magnesium sulfate and evaporated to dryness. The resulting crude white solids are recrystallized from methylene chloride/methanol yielding white crystals, M.P. 253–254°.

The 5-(6-amino-9H-purin-9-yl)-5-deoxy-ribofuranose is prepared in accordance with the following procedure:

A suspension of 10.04 g. of methyl 5-(6-amino - 9H-purin - 9 -yl) - 5 - deoxy - 2,3 - O - isopropylidene ribofuranoside in 500 ml. 0.1 N hydrochloric acid is stirred at 80–85° for 15 hours. The resulting clear solution is neutralized with Amberlite IR–45 and filtered. The filtrate is evaporated to dryness in vacuo and the white crystalline residue triturated with methanol, M.P. 170–171°.

When an equivalent amount of methyl 2,3-O-benzylidene - 5 - O - tosyl - β - D - ribofuranoside is used in place of the methyl 2,3 - O - isopropylidine-5-O-tosyl-β-D-ribofuranoside above there is obtained before hydrolysis methyl 5-(6 - amino - 9H - purin - 9 - yl)-5-deoxy-2,3-O-benzylidene ribofuranoside; and after hydrolysis there is again obtained 5-(6-amino - 9H - purin - 9 - yl)-5-deoxy-ribofuranoside.

What is claimed is:
1. A method for treating lipidemia, which comprises orally administering to a mammal in need of said treatment a hypolipidemic effective amount of a compound of the formula:

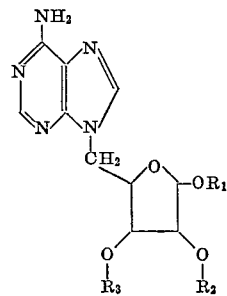

where
$R_1$ is hydrogen or lower alkyl and
$R_2$ and $R_3$ each represent hydrogen or

where $R_4$ and $R_5$ each independently represent lower alkyl or one of $R_4$ or $R_5$ represents hydrogen and the other represents phenyl.

2. A method according to claim 1 wherein the compound is administered at a daily dose of from about 60 milligrams to about 2000 milligrams.

3. A method according to claim 1 wherein the compound is administered in a unit dosage form comprising said compound to the extent of from about 15 milligrams to to about 1000 milligrams per unit dosage.

4. A method according to claim 1 in which the compound is methyl 5-(6-amino-9H-purin-9-yl)-5-deoxy-2,3-O-isopropylidene ribofuranoside.

5. A method according to claim 1 in which the compound is 5-(6-amino-9H-purin-9-yl)-5-deoxy ribuofuranoside.

6. A pharmaceutical composition useful in the treatment of lipidemia comprising as an active ingredient thereof a compound of the formula

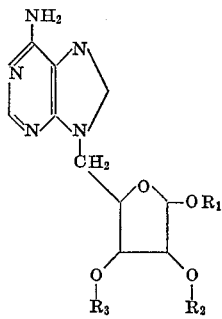

wherein $R_1$, $R_2$ and $R_3$ are as defined in claim 1, and a pharmaceutically acceptable carrier therefor, said compound being present in said composition in an amount sufficient to provide a daily dosage of from about 60 milligrams to about 2000 milligrams of said compound.

7. The pharmaceutical composition of claim 6 wherein said active ingredient is present in said composition to the extent of from about 15 milligrams to about 1000 milligrams per unit dosage.

8. A composition according to claim 6 wherein the carrier is a solid orally ingestible carrier and the active ingredient is present in said composition to the extent of from about 50 to 250 milligrams per unit dosage.

9. A tablet useful in the treatment of lipidemia in mammals comprising as an active ingredient thereof a compound of the formula

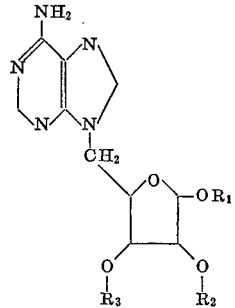

where $R_1$, $R_2$, and $R_3$ are as defined in claim 1, said compound being present in said tablet to the extent of from about 50 to 250 milligrams per unit dosage.

10. A composition according to claim 6 in which the active ingredient is 5-(6-amino-9H-purin-9-yl)-5 - deoxy ribofuranoside.

11. A composition according to claim 6 in which the active ingredient is methyl 5-(6-amino-9H-purin-9-yl)-5-dexoy-2,3-O-isopylidene ribofuranoside.

References Cited
UNITED STATES PATENTS 3,431,252  3/1969  Walton _____ 260—211.5 R X
3,712,885  1/1973  Weimann et al. ____ 260—211.5 R

OTHER REFERENCES

Kawazu: Chem. Commun. (1970), 1047, "A Simple Synthesis of Erithdenine and Its Homologues."

SHEP K. ROSE, Primary Examiner

U.S. Cl. X.R.
60—112.5 R